United States Patent
Woo et al.

(10) Patent No.: US 11,270,570 B2
(45) Date of Patent: Mar. 8, 2022

(54) VEHICLE AND METHOD OF MANAGING CLEANLINESS OF INTERIOR OF THE SAME

(71) Applicants: HYUNDAI MOTOR COMPANY, Seoul (KR); KIA MOTORS CORPORATION, Seoul (KR)

(72) Inventors: Seung Hyun Woo, Seoul (KR); Min Jae Park, Seongnam-si (KR); Anastasia Yarygina, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/110,933

(22) Filed: Dec. 3, 2020

(65) Prior Publication Data
US 2022/0036720 A1     Feb. 3, 2022

(30) Foreign Application Priority Data
Jul. 29, 2020   (KR) .......................... 10-2020-0094603

(51) Int. Cl.
*G08B 21/24*      (2006.01)
*G06K 9/00*       (2022.01)
*H04N 5/247*      (2006.01)

(52) U.S. Cl.
CPC ......... *G08B 21/24* (2013.01); *G06K 9/00832* (2013.01); *H04N 5/247* (2013.01)

(58) Field of Classification Search
CPC ........ G08B 21/24; G08B 21/18; G08B 21/00; G08B 23/00; G06K 9/00832; H04N 5/247
USPC ...................................................... 340/539.32
See application file for complete search history.

(56) References Cited

U.S. PATENT DOCUMENTS

| | | | |
|---|---|---|---|
| 8,370,030 B1* | 2/2013 | Gurin ....................... | B60R 1/00 701/49 |
| 11,017,248 B1* | 5/2021 | Toth ........................ | G08B 21/24 |
| 2018/0307926 A1* | 10/2018 | Tokatyan ........... | G06K 9/00771 |
| 2019/0197325 A1* | 6/2019 | Reiley .................... | G08B 21/24 |
| 2020/0005059 A1* | 1/2020 | Yamada ................. | G08B 21/00 |
| 2020/0151473 A1* | 5/2020 | Seidel ................ | G06Q 30/0645 |
| 2021/0092331 A1* | 3/2021 | Terauchi ............. | H04N 5/2253 |

* cited by examiner

*Primary Examiner* — Brian Wilson
(74) *Attorney, Agent, or Firm* — Morgan, Lewis & Bockius LLP

(57) ABSTRACT

A method of managing cleanliness of an interior of a vehicle includes: detecting an indoor state using a detector including at least a camera; generating at least one of first guidance information on a lost article or second guidance information on a contaminant upon detecting at least one of the lost article or the contaminant as a result of the detecting the indoor state; and transmitting the at least one guidance information to the outside.

18 Claims, 12 Drawing Sheets

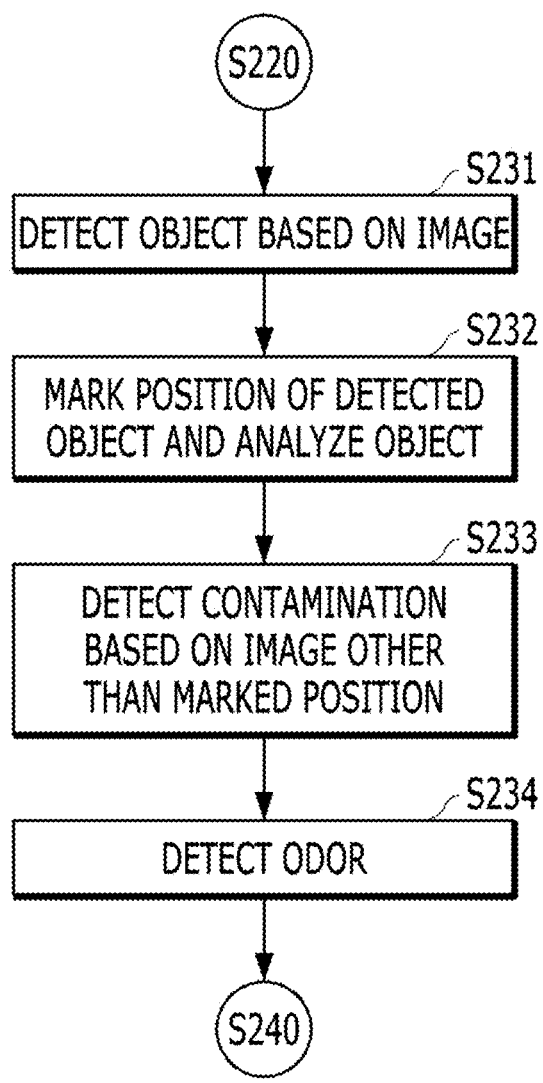

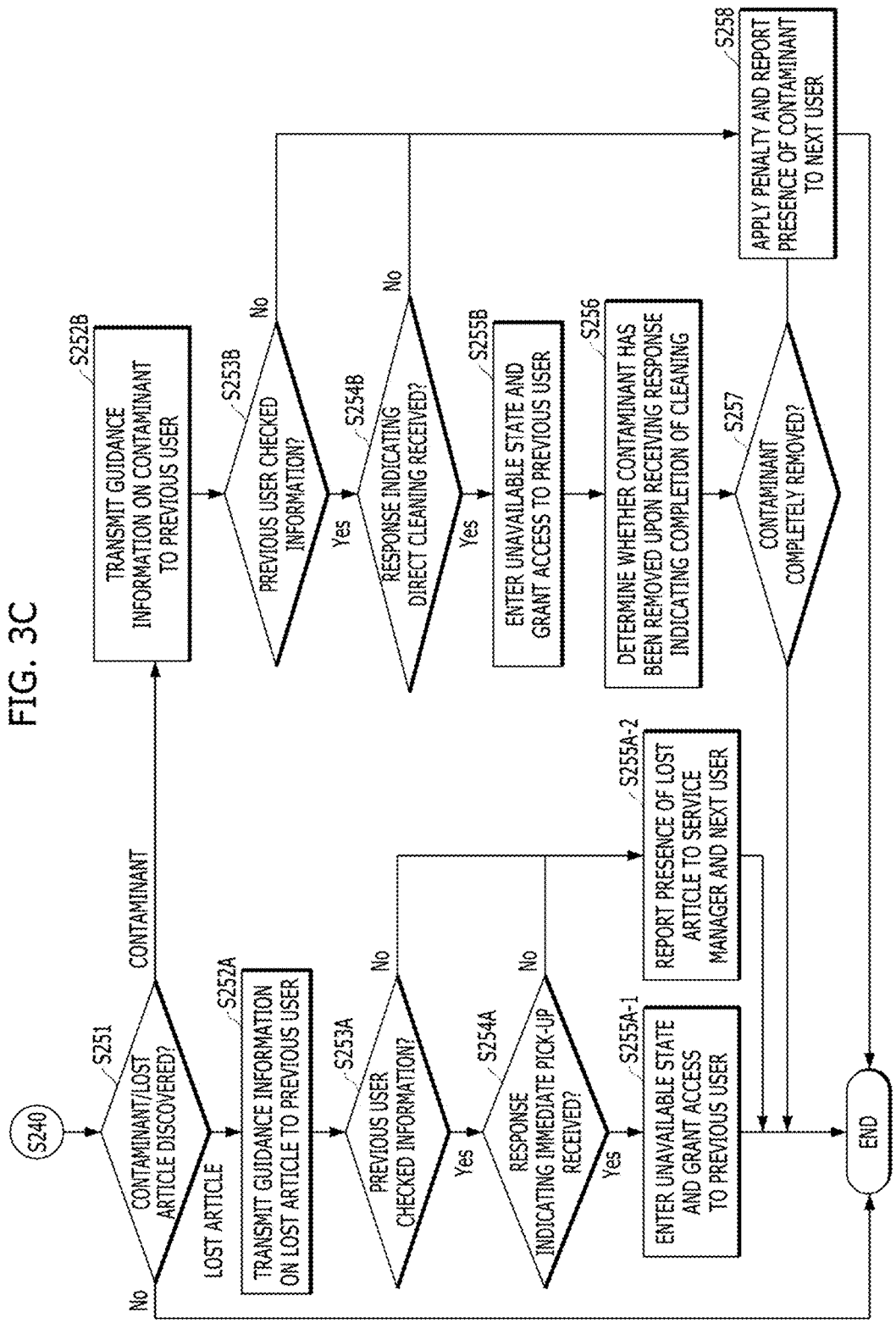

| ICON DISPLAY | | | |
|---|---|---|---|
| TYPE OF CONTAMINANT | SEVERITY OF ODOR | URGENT Y/N | SIZE |
| LIQUID<br><br>SOLID | ∫<br>∫∫<br>∫∫∫ | ⚠ | SIZE OF ICON IS CHANGEABLE DEPENDING ON SIZE OF CONTAMINANT |

810

VEHICLE AND METHOD OF MANAGING CLEANLINESS OF INTERIOR OF THE SAME

CROSS-REFERENCE TO RELATED APPLICATION(S)

This application claims the benefit of Korean Patent Application No. 10-2020-0094603, filed on Jul. 29, 2020 in the Korean Intellectual Property Office, which is hereby incorporated by reference as if fully set forth herein.

TECHNICAL FIELD

The present disclosure relates to a vehicle and a method of managing cleanliness of an interior of the same that are capable of, when detecting a contaminant or a lost article remaining in the interior of the vehicle after completion of use of the vehicle, taking measures to respond thereto.

BACKGROUND

While a vehicle is traveling, an object present in an interior of the vehicle is subjected to inertial force due to changes in the road surface or acceleration/deceleration of the vehicle. For this reason, in many cases, an object that may cause contamination, such as food, spills and soils a seat or a mat of the vehicle. In the case in which indoor contamination occurs in a privately owned vehicle, the vehicle owner may freely determine whether or not to clean the vehicle. However, in recent years, the concept of vehicle sharing, rather than individual ownership, has expanded due to the advantages of cost savings and utilization efficiency, and thus vehicle sharing and related service markets are expected to maintain high growth. Accordingly, the need to manage the cleanliness of the interior of a vehicle is on the rise.

In a vehicle-sharing service, many unspecified persons may share the same vehicle. Most users have little or no sense of ownership over a shared vehicle, unlike a privately owned vehicle, and thus pay little attention to indoor contamination while using the shared vehicle. Therefore, in many cases, at the end of use thereof, a vehicle is returned with the interior thereof soiled, and is handed over to the next user with the interior thereof in an uncleaned state, which causes dissatisfaction with service quality.

However, a conventional vehicle-sharing service does not provide a function of determining the state of cleanliness of the interior of the vehicle, and thus it is not possible to inform users of the state of cleanliness of the vehicle to be used.

SUMMARY

The present disclosure is directed to a vehicle and a method of managing the cleanliness of the interior of the same that substantially obviate one or more problems due to limitations and disadvantages of the related art.

An object of the present disclosure is to provide a vehicle and a method of managing the cleanliness of the interior of the same that are capable of more effectively detecting whether a contaminant or a lost article remains in the interior of a vehicle and taking measures to respond thereto.

However, the objects to be accomplished by the embodiments are not limited to the above-mentioned objects, and other objects not mentioned herein will be clearly understood by those skilled in the art to which the embodiments pertain from the following description.

In order to accomplish the above and other objects, a method of managing cleanliness of an interior of a vehicle according to an embodiment of the present disclosure may include: detecting an indoor state using a detector including at least a camera; generating at least one of first guidance information on a lost article or second guidance information on a contaminant upon detecting at least one of the lost article or the contaminant as a result of the detecting the indoor state; and transmitting the at least one guidance information to the outside.

In addition, a device for managing cleanliness of an interior of a vehicle according to another embodiment of the present disclosure may include: a detector including at least a camera; a communicator; and a controller configured to detect an indoor state based on information acquired using the detector, to generate at least one of first guidance information on a lost article or second guidance information on a contaminant when at least one of the lost article or the contaminant is found to be present as a result of detection of the indoor state, and to perform control such that the at least one guidance information is transmitted to the outside through the communicator.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3A is a flowchart showing an example of the manner in which the indoor state detection process of FIG. 2 is performed;

FIG. 3C shows an example of the manner in which the guidance information output step of FIG. 2 is performed;

DETAILED DESCRIPTION

Figure 1:
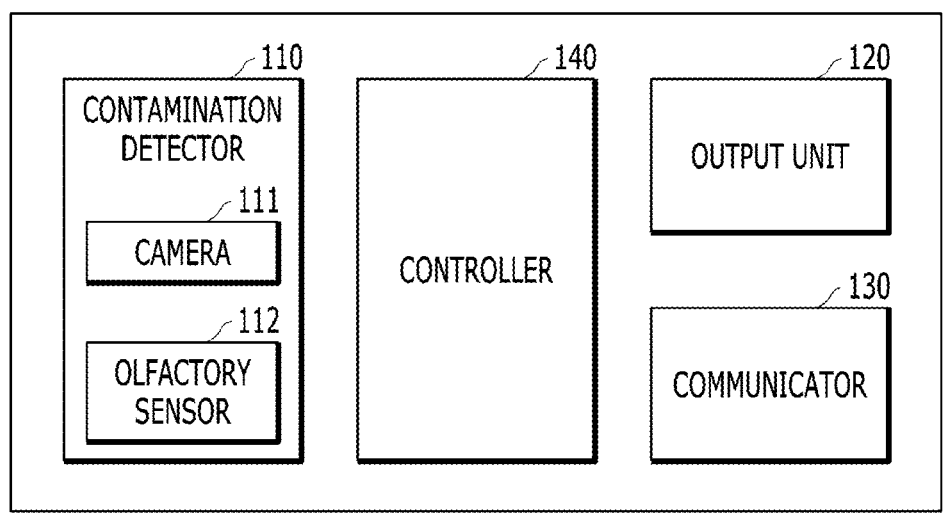
FIG. 1 shows an example of the structure of a device for managing the cleanliness of the interior of a vehicle to which embodiments of the present disclosure are applicable.

Hereinafter, embodiments of the present disclosure will be described in detail with reference to the accompanying drawings so that those skilled in the art may easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

An embodiment of the present disclosure proposes technology for detecting and analyzing the state of the interior of a vehicle in various manners after the end of use thereof and for outputting guidance information based thereon.

FIG. 1 shows an example of the structure of a device for managing the cleanliness of the interior of a vehicle to which embodiments of the present disclosure are applicable.

Referring to FIG. 1, a device for managing the cleanliness of the interior of a vehicle to which embodiments of the present disclosure are applicable may include a detector 110, which detects the presence or absence of a target object, such as a contaminant or a lost article, in the interior of the vehicle, an output unit 120, which outputs guidance information, a communicator 130, which performs communication with an internal device and an external device of the vehicle so as to exchange data therewith, and a controller 140, which performs overall control of the aforementioned components.

The detector 110 may include a camera 111 for acquiring an image of the interior of the vehicle in order to detect a target object based on image information and an olfactory sensor 112 for detecting contamination through odor. The camera 111 may include a plurality of cameras depending on the area of the interior that is subjected to detection and on the contamination detection method. For example, the cameras may be disposed at a region near the rear-view mirror in order to photograph the front seats and the surroundings thereof (e.g. the driver's seat, the front passenger seat, the dashboard, etc.) and at the center or the rear end portion of the roof in order to photograph the rear seats and the surroundings thereof (e.g. the rear passenger seats, the lower end region of the rear glass, etc.), without being limited thereto. The position and number of cameras are not limited, so long as it is possible to effectively photograph the indoor region that is being subjected to contamination detection. Similarly, the position and number of olfactory sensors 112 are not limited.

At least one of a general RGB-type camera, an infrared (IR) camera, a stereo camera for capturing a three-dimensional (3D) image, or a camera equipped with a spectroscopic sensor may be used as the camera 111 in order to detect an object (i.e. a lost article) and contamination, which will be described later.

Although not illustrated in FIG. 1, the detector 110 may further include a dust sensor for analyzing the particle concentration of dust or fine dust in the indoor air.

The output unit 120 may output guidance information in various forms. For example, the output unit 120 may include a display to output guidance information in the form of visual information, or may include a speaker to output guidance information in the form of acoustic information. The display may include a display of a head unit or a display disposed in a cluster. However, the display is not limited to any specific form, so long as it is capable of visually outputting guidance information.

The communicator 130 may include at least one of a wired communicator (not shown), through which the vehicle cleanliness management device communicates with other entities (e.g. control units) mounted in the vehicle, and a wireless communicator (not shown), through which the vehicle cleanliness management device communicates with entities (e.g. an external server, a smart device carried by an occupant, etc.) other than the corresponding vehicle. The wired communicator may support one or more protocols that are applicable to predetermined vehicle network communication, such as CAN, CAN-FD, LIN, and Ethernet, without being limited thereto. The wireless communicator may support at least one of short-range communication (e.g. Bluetooth, Wi-Fi, Wi-Di, ZigBee, NFC, etc.) for communication with a smart device carried by an occupant, telematics, or cellular-based communication (e.g. 3G, LTE, 5G, etc.).

When a preset condition is satisfied, the controller 140 may acquire information for determination of the indoor state from the detector 110 to analyze the presence or absence of a contaminant or a lost article and the contamination level (or cleanliness level). The controller 140 may output guidance information corresponding to the analysis result through the output unit 120 in the vehicle, or may transmit the guidance information through the communicator 130 such that the guidance information is output through another device, rather than into the interior of the vehicle. Thus, in the embodiments to be described below, output of the guidance information may include not only output of the guidance information to an occupant through the output unit 120 disposed in the vehicle but also transmission of the guidance information through the communicator 130 so as to output the same through an external device. Here, the external device may be a vehicle-sharing service server, a telematics server, or a terminal carried by an occupant, without being limited thereto. In addition, the condition under which determination of the indoor state is started may be the case in which a specific signal is received through the communicator 130, the case in which a predetermined time period of use assigned to the current user has expired, or the case in which the current user inputs a command indicating end of use through a predetermined input unit (e.g. a head unit) in the vehicle. However, this is merely illustrative, and the present disclosure is not limited thereto.

Hereinafter, a process of managing the cleanliness of the interior of a vehicle will be described in detail on the basis of the configuration of the vehicle cleanliness management device described above.

Figure 2:
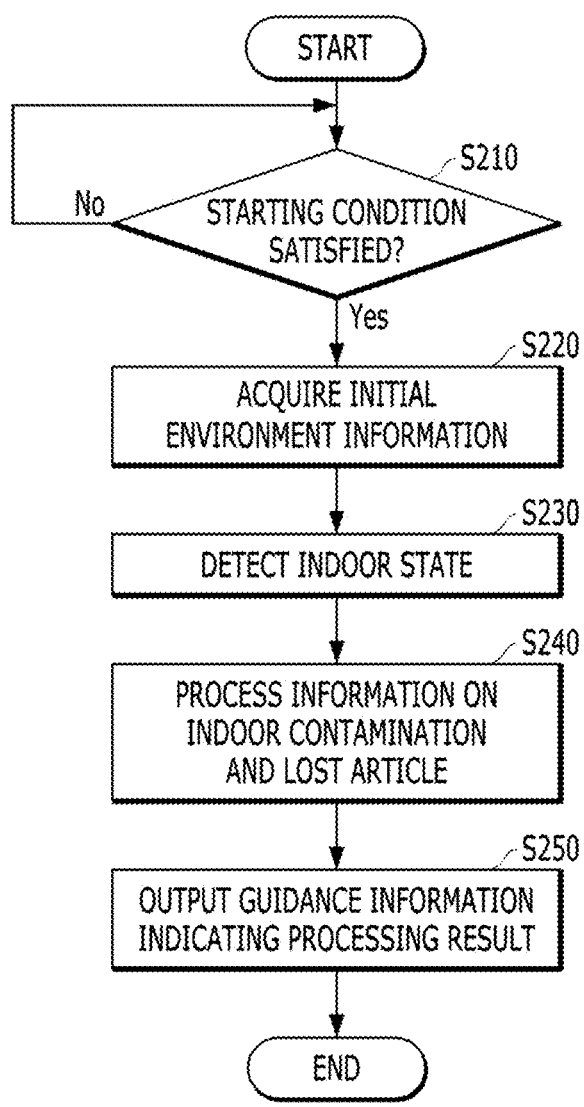
FIG. 2 is a flowchart showing an example of a process of managing the cleanliness of the interior of a vehicle according to an embodiment of the present disclosure.

FIG. 2 is a flowchart showing an example of a process of managing the cleanliness of the interior of a vehicle according to an embodiment of the present disclosure.

Referring to FIG. 2, the controller 140 may determine whether a starting condition is satisfied (S210). Since the starting condition is the same as described above, a duplicate description thereof will be omitted.

When the starting condition is satisfied (Yes in S210), initial environment information may be acquired (S220). Here, the initial environment information may be information on the state of the interior of the vehicle before the current user starts to use the vehicle. For example, the initial environment information may be information on the state of the interior of the vehicle when the vehicle is shipped, information on the state before the current user starts to drive the vehicle after the end of the last use thereof, or information on the state before contamination occurs after the current user gets in the vehicle. Thus, this step may be performed in the manner of acquiring an image for determination of the vehicle interior material, the location of basic in-vehicle items, and the color of the seats and mats through the camera 111 and detecting the odor of the interior before contamination through the olfactory sensor 112. In another embodiment, this step may be performed in the manner of acquiring default initial environment information from a vehicle-sharing service server. In still another embodiment, this step may be omitted.

Subsequently, indoor state detection may be performed through the detector 110 in order to detect indoor contamination and a lost article (S230). A detailed description of the detection process S230 will be made later with reference to FIGS. 3A, 4A, 4B, 5A, 5B, 5C, 6A, and 6B.

The controller 140 may perform information processing on indoor contamination and a lost article based on the detection information (S240). Here, information processing may be a process of generating guidance information. To this end, the controller 140 may acquire an image of a contaminant or a lost article, may determine the contamination level (or cleanliness level), and may determine a cleaning time or a cleaning cost based thereon. The cleaning cost may correspond to a penalty fee imposed on the previous user who does not directly clean the vehicle and to an amount of a reward given to the next user who directly cleans the vehicle.

A detailed description of information-processing step S240 will be made later with reference to FIGS. 3B, 7A, 7B, 8A, 8B and 9.

When guidance information is generated in information-processing step S240, the controller 140 may output the guidance information, and may perform follow-up processing according to user response to the output guidance information (S250). A detailed description of follow-up processing step S250 using the guidance information and the form in which the guidance information is output will be made later with reference to FIGS. 3C, 10A, 10B, 10C and 10D.

Hereinafter, the indoor state detection process will be described in greater detail with reference to FIGS. 3A, 4A, 4B, 5A, 5B, 5C, 6A, and 6B.

FIG. 3A is a flowchart showing an example of the manner in which the indoor state detection process of FIG. 2 is performed.

Referring to FIG. 3A, in order to detect the indoor cleanliness, object detection may be performed based on an image captured by the camera 111 (S231). The object detection may be a process of detecting an object that was not present in the initial state through object detection logic in an image captured by an RGB camera or a stereo camera. In this case, the controller 140 may directly perform the object detection using preset artificial intelligence (AI) logic, or may transmit an image acquired through the camera 111 to an external server through the communicator 130 and may receive an object detection result from the external server. In addition, in order to detect an object that was not present in the initial state, the controller 140 may compare the currently acquired image with the initial environment information. The object detected in this process may be classified as a lost article.

Since the present disclosure is not limited to any specific object detection and analysis logic, a concrete description of the algorithm of the object detection and analysis logic will be omitted.

When at least one object is determined to be present in the interior of the vehicle through the object detection and analysis process S231, the controller 140 may mark (i.e. record) the position at which the corresponding object is detected (S232). In addition, in this process, the type of the object (e.g. clothing, a container, etc.) may be analyzed through image recognition.

The controller 140 may detect whether the interior of the vehicle has been contaminated based on an image captured by the camera 111 (S233). In this case, the indoor region that is being subjected to contamination detection may be a region other than the region in which an object is detected. The reason for this is to prevent the object itself from being mistaken as contamination.

As a contamination detection method, a method of determining whether the inherent color of molecules of indoor components differs from the initial environment information using a spectroscopic sensor may be applied. For example, if both the wavelength corresponding to the inherent color of a leather seat and the wavelength corresponding to another color are detected, it may be determined that the leather seat has been contaminated. In addition, if the reflectivity of a certain part in an image captured by an RGB camera or an IR camera increases, it may be determined that the part has been contaminated by liquid. Apart from the above contamination detection methods, any other contamination detection method may be applied, so long as it is possible to determine contamination through image analysis or optical analysis.

In addition, in order to detect the indoor state, odor detection may be performed using the olfactory sensor 112 (S234). Although the odor detection process is illustrated in FIG. 3A as being performed in the final stage, it may be performed prior to the image-based detection process, or may be performed simultaneously therewith. In the situation in which contamination is not detected based on optical detection (using the camera 111) in a region other than the region in which an object is detected, if an odor corresponding to contamination is detected, the odor may be determined to be caused by the object.

Figure 4A:
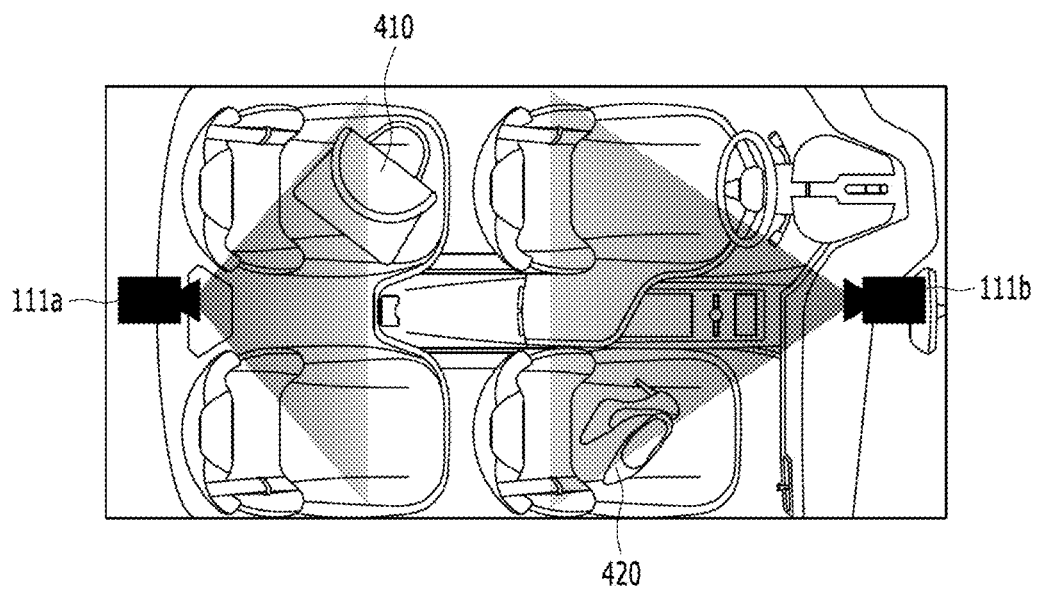
FIGS. 4A and 4B show an example of the manner in which image-based object detection is performed according to an embodiment of the present disclosure.
Figure 4B:
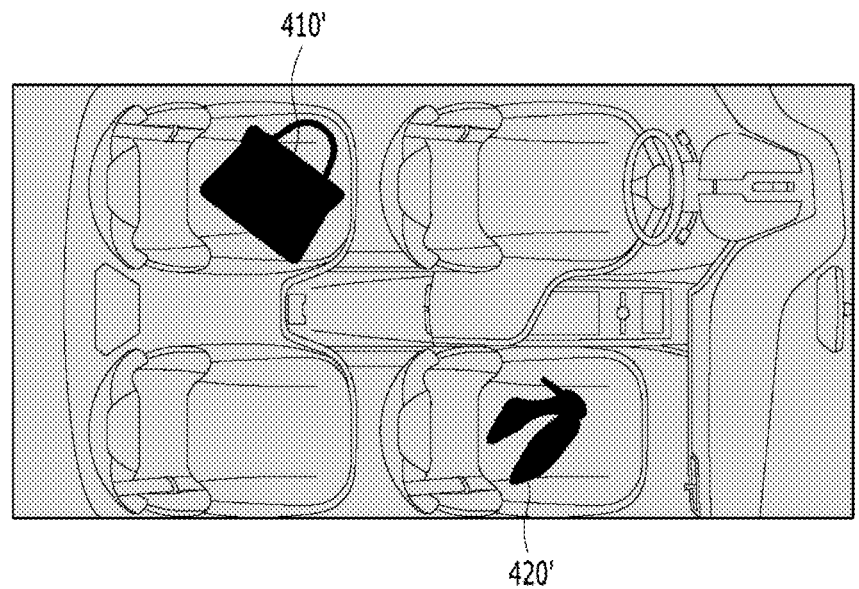

FIGS. 4A and 4B show an example of the manner in which image-based object detection is performed according to an embodiment of the present disclosure.

In FIGS. 4A and 4B and the drawings below, it is assumed that the camera 111 mounted in the interior of the vehicle includes a camera 111a disposed at a region near the rear seats in order to photograph the rear seats and the surroundings thereof and a camera 111b disposed at a region near the front seats in order to photograph the front seats and the surroundings thereof.

Referring to FIG. 4A, an object 410 present on the rear seat behind the driver's seat and an object 420 present on the front passenger seat may be detected through the image-based detection process. The controller 140, as shown in FIG. 4B, may mark positions 410' and 420' at which the objects 410 and 420 are respectively detected so that the positions 410' and 420' are excluded from the region that is subjected to contamination detection when the image-based contamination detection process is performed.

Figure 5A:
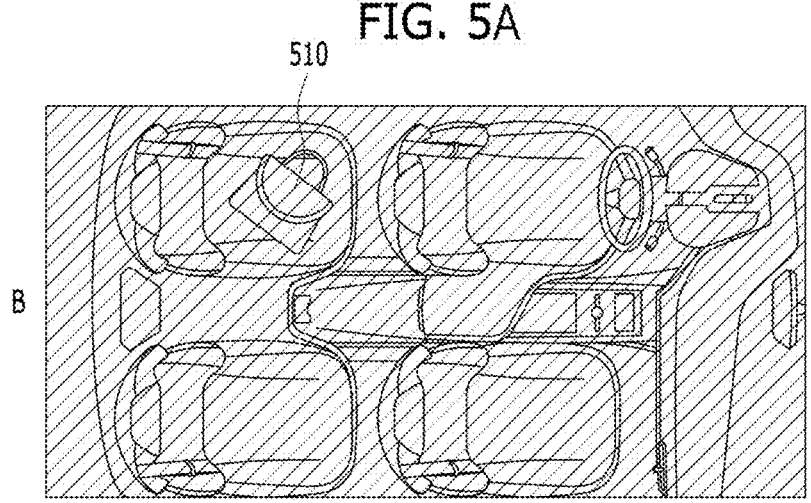
FIGS. 5A, 5B and 5C show an example of the manner in which image-based contamination detection is performed according to an embodiment of the present disclosure.
Figure 5B:
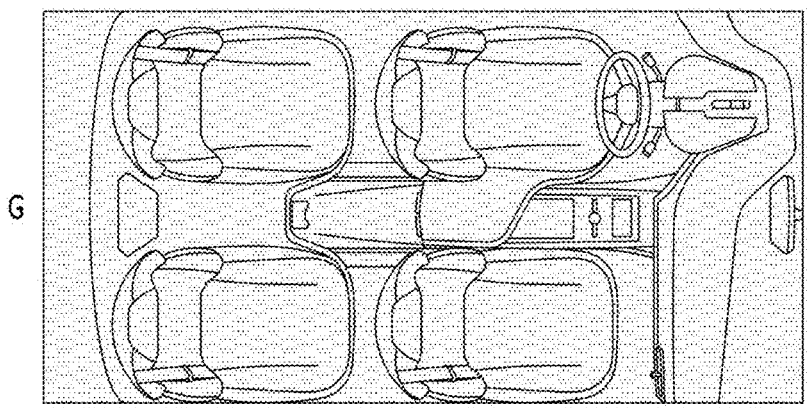
Figure 5C:
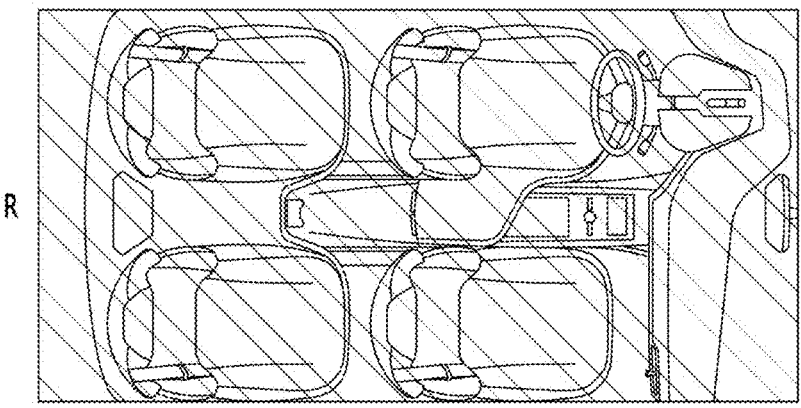

FIGS. 5A, 5B and 5C show an example of the manner in which image-based contamination detection is performed according to an embodiment of the present disclosure.

FIGS. 5A, 5B and 5C show an example of an image captured in order to apply a spectroscopy technique to each RGB color region. Here, if there is a region 510 in which a wavelength different from that of the initial environment information is detected, the region 510 may be recognized as a contaminated region. Similar to the detection process of FIGS. 4A and 4B, if an object 410 is detected on the rear seat behind the driver's seat, the region 510 is excluded from the region that is subjected to contamination detection, and thus the difference between the wavelength detected in the region 510 and the initial environment information may be ignored.

Figure 6A:
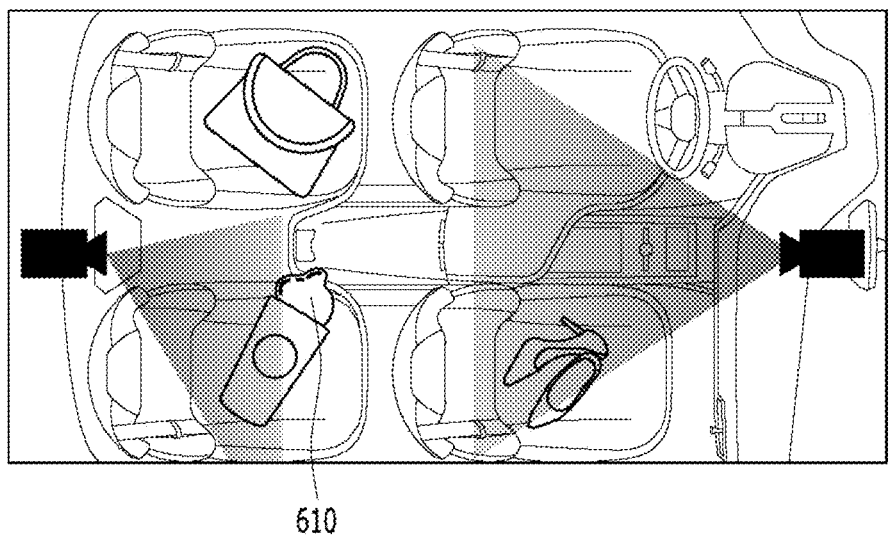
FIGS. 6A and 6B show an example of the manner in which image-based contamination tracking is performed according to an embodiment of the present disclosure.
Figure 6B:
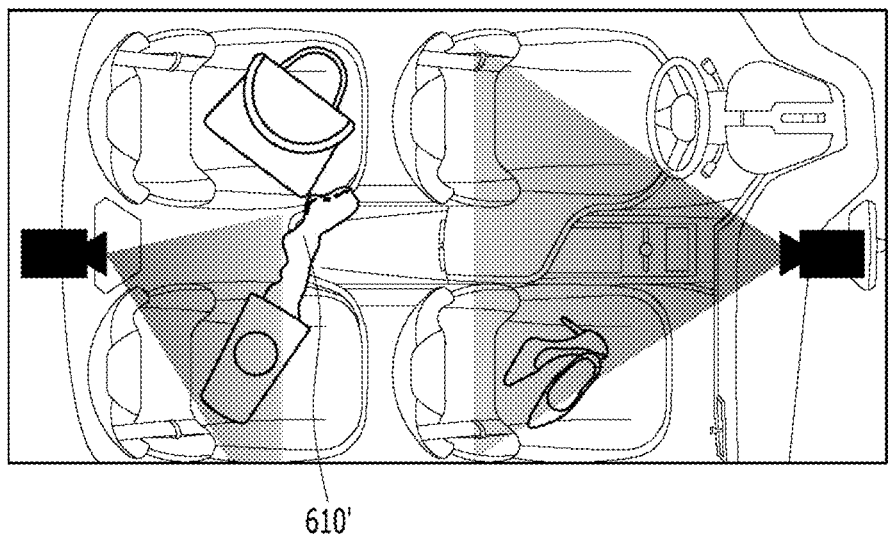

FIGS. 6A and 6B show an example of the manner in which image-based contamination tracking is performed according to an embodiment of the present disclosure.

Referring to FIG. 6A, a contaminated region 610 may be detected in the indoor state detection process. When it is determined that the contaminated region 610 is contaminated by liquid, the indoor state detection may be performed again at regular intervals. When it is determined that the size of the contaminated region 610 is increasing, as indicated by reference numeral 610' in FIG. 6B, the controller 140 may determine that the contamination level is increasing.

Hereinafter, information-processing step S240 will be described with reference to FIGS. 3B, 7A, 7B, 8A, 8B, and 9.

Figure 3B:
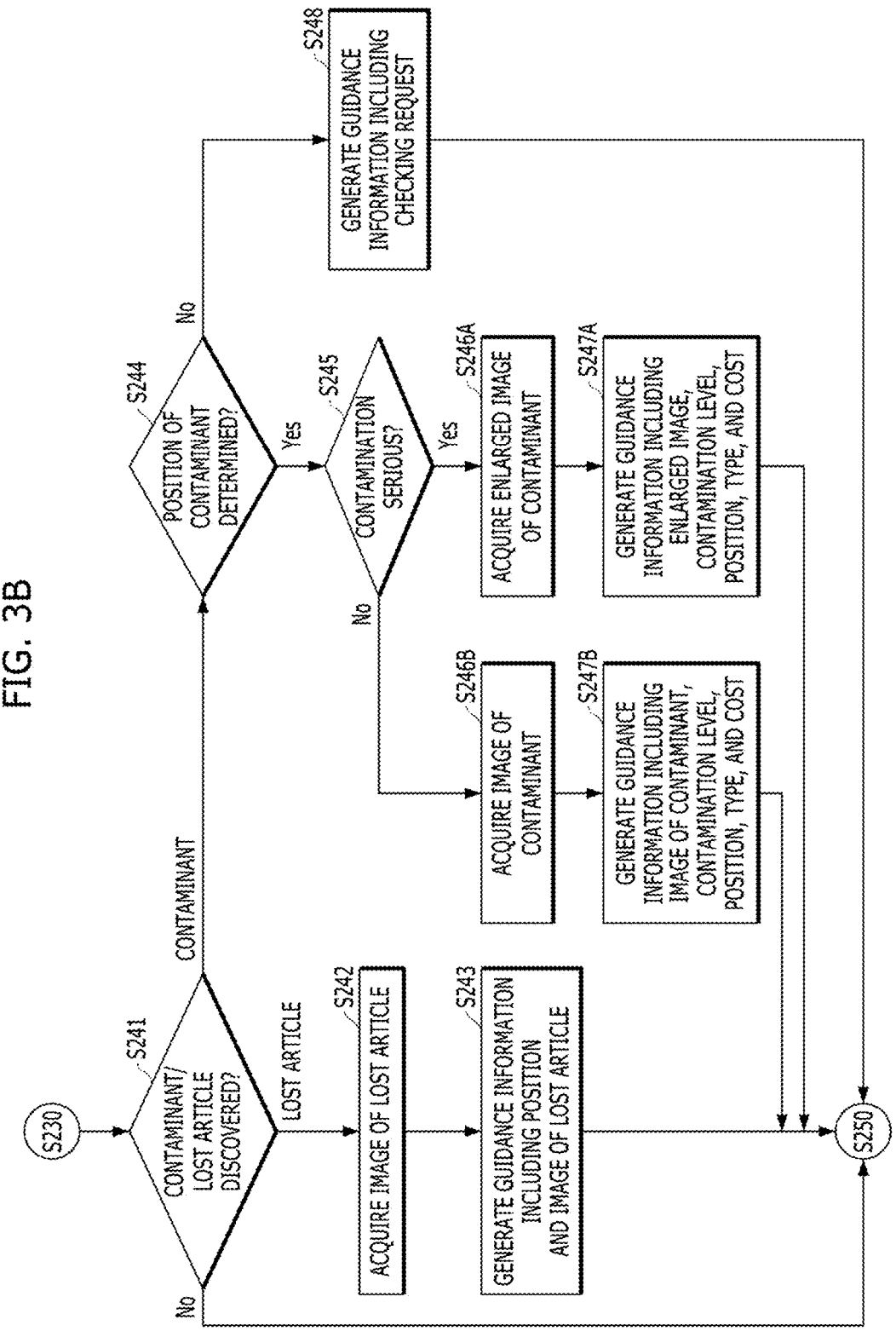
FIG. 3B shows an example of the manner in which the information-processing step of FIG. 2 is performed.

FIG. 3B shows an example of the manner in which the information-processing step of FIG. 2 is performed.

Referring to FIG. 3B, the controller 140 may generate guidance information according to different processes depending on whether a contaminant of a lost article is discovered (S241) based on the indoor state detection result.

In the case in which a lost article is discovered, the controller 140 may acquire an image of the lost article (S242), and may generate guidance information including the position of the lost article and the acquired image thereof (S243). Here, the position of the lost article may be a specific position in the interior of the vehicle (e.g. the driver's seat, the front passenger seat, the footrest of the rear seat, etc.), and the image of the lost article may be acquired by processing an image captured in the indoor state detection process, or may be an image captured separately by the camera 111 in this process. In order to determine the position of the lost article, the controller 140 may use a preset table. Here, the table may be a table in which each indoor part is defined so as to match a respective one of the regions or pixels of the image captured by the camera 111, without being limited thereto.

In the case in which a contaminant is discovered, the controller 140 may determine the position of the contaminant (S244) independently of information-processing on the lost article. When the contaminant is detected using an image captured by the camera 111, the position of the contaminant may be determined using the aforementioned table. When the contaminant is not captured by the camera 111 (for example, when the contaminant is detected due to the odor thereof), the position of the contaminant may not be determined (No in S244).

When determination of the position of the contaminant is possible (Yes in S244), the controller 140 may determine the contamination level (S245).

The contamination level may be analyzed in the following manner.

In one example, the contamination level may be analyzed on the basis of the type and position of a contaminant.

TABLE 1

| Type of Contaminant | Size of Contaminated Region | Difference between Color of Contaminated Region and Original Color | Material Property | Severity of Odor |
|---|---|---|---|---|
| Liquid | 30 cm or Greater | Large Difference | High Viscosity | High |
| Solid | 5 to 30 cm | Intermediate Difference | Low Viscosity | Intermediate |
|  | Less than 5 cm | Small Difference | No Viscosity (Dry) | No Odor |

As can be seen from Table 1, the contamination may be classified on the basis of the type of contaminant, the size of the contaminated region, the difference between the color of the contaminated region and the original color, the material property (viscosity), and the severity of odor. The contamination level may be given different scores (or weights) depending on the classification of each item. For example, if the size of the contaminated region is 30 cm or greater, the color difference is large, and the severity of odor is high, the contamination level may be determined to be very high, and if the size of the contaminated region is less than 5 cm, the color difference is small, and there is no odor, the contamination level may be determined to be low.

TABLE 2

| Material of Contaminated Region | Elapsed Time since Contamination Discovery |
|---|---|
| Leather | 60 Minutes or more |
| Fabric | 30 to 60 Minutes |
| Plastic | 10 to 30 Minutes |
| Metal | Within 10 Minutes |

As can be seen from Table 2, the contamination level may be weighted differently depending on the material of the contaminated region and the contamination time period for each material. For example, in the case of metal, which is relatively resistant to contamination, the contamination level may not greatly increase even when a large amount of time passes after contamination. However, in the case of fabric, which is susceptible to contamination, the contamination level may be weighted strongly so as to greatly increase even when a small amount of time passes after contamination.

Even when the size of the contaminated region is small or the severity of any odor is low, if a preset specific substance or a distasteful contaminant, such as a cigarette butt or food, is discovered, the contamination level may be immediately determined to be very high.

In summary, the controller 140 may give a contamination score to each item shown in Tables 1 and 2 such that the contamination score gradually decreases from the uppermost criterion of each item to the lowermost criterion thereof, and may determine the contamination level by summing the scores given to the respective items. However, this is merely illustrative, and it will be apparent to those skilled in the art that the items/criteria shown in Tables 1 and 2 and the weights given thereto may be variously set.

Upon determining the contamination level, the controller 140 may determine an estimated cleaning time and a cleaning cost based on the contamination level.

When the contamination level is high (Yes in S245), the controller 140 may acquire an enlarged image of the contaminant using the camera 111 (S246A), and may generate guidance information including at least one of the enlarged image, the contamination level, the position of the contaminant, the type of the contaminant, a cleaning cost, a penalty fee, or an estimated cleaning time (S247A). Here, the reason for acquiring the enlarged image is to cause the user to intuitively realize the seriousness of the contamination.

When the contamination level is not high (No in S245), the controller 140 may acquire an image of the contaminant using the camera 111 (S246B). The image acquired in this process may be an image generated at a lower magnification than that of the enlarged image mentioned above. Accordingly, the controller 140 may generate guidance information including at least one of the image of the contaminant, the contamination level, the position of the contaminant, the type of the contaminant, a cleaning cost, a penalty fee, or an estimated cleaning time (S247B).

In some embodiments, when the contamination level is not high, image acquisition step S246B may be omitted. In this case, the image may also be omitted from the guidance information.

When determination of the position of the contaminant is impossible (No in S244), the controller 140 may generate guidance information including a checking request without an image (S248). According to another embodiment, when the severity of odor is low, the controller 140 may perform air-conditioning control for ventilation, rather than generating guidance information to be sent to the previous user.

Hereinafter, the manner in which guidance information is prepared will be described with reference to FIGS. 7A, 7B, 8A, 8B, and 9.

Figure 7A:
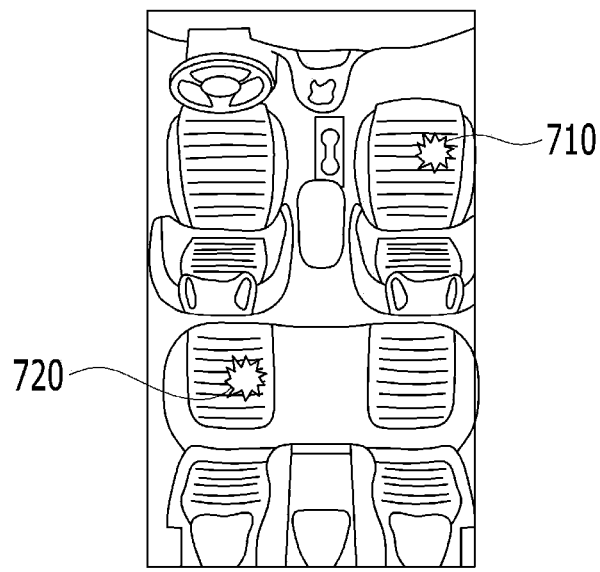
FIGS. 7A and 7B show an example of the manner in which an image of a contaminant is acquired according to an embodiment of the present disclosure.
Figure 7B:
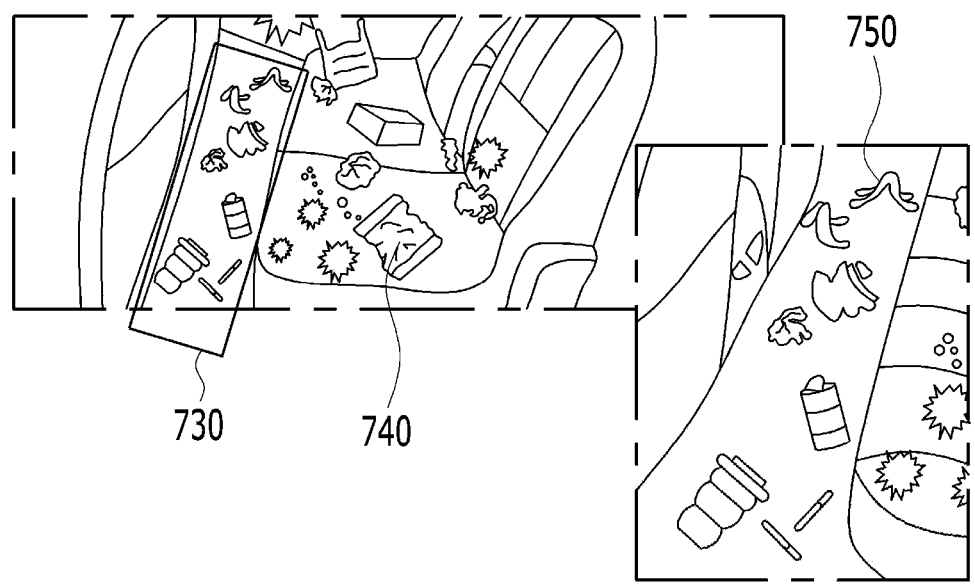

FIGS. 7A and 7B show an example of the manner in which an image of a contaminant is acquired according to an embodiment of the present disclosure.

Referring to FIG. 7A, when a contaminant 710 has a size smaller than a first size (e.g. 3 cm) or has a low contamination level, the controller 140 may not acquire an image of the contaminant 710. However, when the contaminant 710 has a size larger than a second size (e.g. 10 cm) or has a high contamination level, the controller 140 may acquire an enlarged image of the contaminant 710.

When acquiring an image of a contaminant, the controller 140 may vary the magnification depending on the contaminated region. For example, in the case in which the camera 111 is mounted on the roof in the interior of the vehicle, as shown in FIG. 7B, because a rear footrest region 730 between the front seat and the rear seat is spaced farther from the camera 111 than the rear seat, even the same object may appear different in size depending on the position thereof in an unprocessed image. Therefore, when acquiring an image of a contaminant located in the rear footrest region 730, the controller 140 may acquire a contaminant image 750 at a magnification higher than that at which the controller 140 acquires an image of a contaminant located on the rear seat 740.

According to an embodiment, an image of a contaminant may be substituted with an icon. This will be described with reference to FIGS. 8A and 8B.

Figures 8A, 8B:
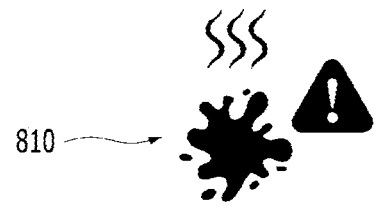
FIGS. 8A and 8B shows an example of contamination guidance information according to an embodiment of the present disclosure.

FIGS. 8A and 8B show an example of the contamination guidance information according to an embodiment of the present disclosure.

Referring to FIG. 8A, the shape of a main icon may be determined depending on the type of contaminant, and a first auxiliary icon indicating the severity of odor and a second auxiliary icon indicating the severity of contamination (e.g. the situation in which a contaminated region is expanding or in which the cleanliness is very low) may be displayed near the main icon. In addition, the size of the main icon may be changed depending on the size of the contaminated region. In addition, the color of the main icon may be changed depending on the contamination level. For example, a blue main icon may indicate a low contamination level, a yellow main icon may indicate an intermediate contamination level, and a red main icon may indicate a high contamination level. However, this is merely illustrative, and the present disclosure is not limited thereto. According to another embodiment, the contamination level may be divided into 5 stages, and different colors may be respectively assigned to the 5 stages. According to still another embodiment, the contamination level may be divided into more than 5 stages, and accordingly, the number of colors corresponding to the respective stages of the contamination level may increase.

In one example, in the case in which a region contaminated by liquid having an intermediate contamination level and a strong odor is expanding, the icon 810 may have the shape shown in FIG. 8B.

As described above, the guidance information may include the position of a contaminant. This will be described below with reference to FIG. 9.

Figure 9:
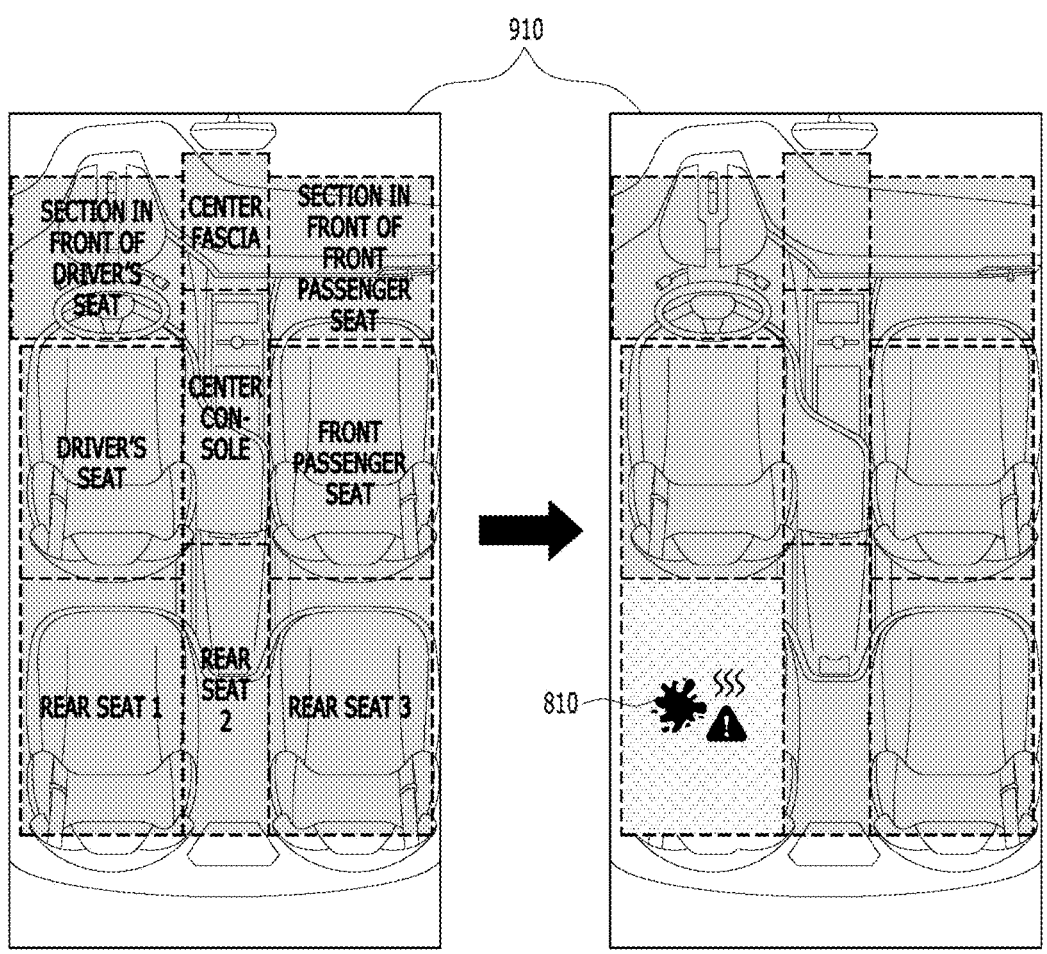
FIG. 9 shows an example of contaminant guidance information for each section according to an embodiment of the present disclosure.

FIG. 9 shows an example of contaminant guidance information for each section according to an embodiment of the present disclosure.

Referring to the left drawing in FIG. 9, the indoor region 910 of the vehicle included in the guidance information may be divided into nine sections, namely, the section in front of the driver's seat (e.g. the steering wheel, the dashboard in front of the driver's seat, the region around the pedal, etc.), the center fascia, the section in front of the front passenger seat (e.g. the glove compartment, the dashboard in front of the front passenger seat, the mat in front of the front passenger seat, etc.), the driver's seat, the center console, the front passenger seat, the rear seat 1, the rear seat 2, and the rear seat 3. As shown in the right drawing in FIG. 9, the controller 140 may display the icon 810, described above with reference to FIGS. 8A and 8B, in the section in which contamination is detected so that the occupant may intuitively recognize which section is contaminated. In addition to the icon 810, a predetermined visual effect (e.g. warning coloration) may be further applied to the section in which contamination is detected.

In some embodiments, a contaminated region may be displayed using an image of a contaminant and a visual effect associated therewith, rather than using the icon 810. This will be described later with reference to FIGS. 10A, 10B, 10C, and 10D.

Hereinafter, follow-up processing step S250 through detailed guidance information and the form in which the guidance information is output will be described with reference to FIGS. 3C, 10A, 10B, 10C, and 10D.

FIG. 3C shows an example of the manner in which the guidance information output step of FIG. 2 is performed.

Referring to FIG. 3C, the controller 140 may output guidance information according to different processes depending on whether a contaminant or a lost article is discovered (S251), and may perform follow-up processing corresponding thereto.

When a lost article is discovered, the controller 140 may output (i.e. transmit) guidance information on the lost article so that the previous (i.e. most recent) user may check the same (S252A). Here, transmission of the guidance information conceptually includes not only direct transmission of the guidance information from the controller 140 to a terminal carried by the previous user through the communicator 130 but also transmission of the guidance information via a vehicle-sharing service server or a telematics center.

The controller 140 may wait for confirmation of the guidance information on the lost article by the previous user (S253A). When a response is not received within a predetermined period of time, the controller 140 may determine that the previous user has not checked the guidance information (No in S253A).

When a response is received (Yes in S253A), the controller 140 may check the content of the response (S254A). When the response corresponds to "I will pick up now" (Yes in S254A), the controller 140 may perform control such that the vehicle enters an unavailable state so as to be prevented from being assigned to the next user before the previous user picks up the lost article, and may grant access (e.g. authority to open the door) to the previous user (S255A-1).

When it is determined that the previous user has not checked the guidance information (No in S253A) or when a response other than the "I will pick up now" response (e.g. "I will pick up later" or "Not mine") is received (No in S254A), the controller 140 may report the presence of a lost article to the vehicle-sharing service server and to the next user (if any) through the communicator 130 (S255A-2).

On the other hand, when a contaminant is discovered, the controller 140 may transmit guidance information on the contaminant so that the previous (i.e. most recent) user may check the same (S252B). Since the manner in which the guidance information on the contaminant is transmitted is the same as the above-described manner in which the guidance information on the lost article is transmitted, a duplicate description thereof will be omitted.

The controller 140 may wait for confirmation of the guidance information on the contaminant by the previous user for a predetermined period of time (S253B). When a response is received (Yes in S253B), the controller 140 may check the type of response (S254B).

When the response corresponds to "I will clean it myself" (Yes in S254B), the controller 140 may perform control such that the vehicle enters an unavailable state so as to be prevented from being assigned to the next user while the previous user cleans the contaminant, and may grant access (e.g. authority to open the door) to the previous user (S255B).

When the previous user returns to the vehicle to clean the same after opening the door and transmits a response indicating completion of cleaning through an input unit in the vehicle or a terminal of the user (or when an estimated cleaning time passes), the controller 140 may perform the indoor state detection process again to determine whether the contaminant has been removed (S256).

Upon determining that the contamination corresponding to the contaminant guidance information has been removed (Yes in S257), the controller 140 may perform a normal return process. Otherwise (No in S257), the controller 140 may report non-performance of cleaning to the vehicle-sharing service server through the communicator 130 so that a penalty is imposed on the corresponding user, and may report the presence of the contaminant to the next user (if any) (S258).

Hereinafter, the form in which guidance information is output through a terminal carried by a user will be described with reference to FIGS. 10A, 10B, 10C, and 10D.

FIGS. 10A, 10B, 10C, and 10D show an example of the form in which guidance information is displayed on a terminal of a user according to an embodiment of the present disclosure.

Referring to each image shown in FIGS. 10A, 10B, 10C, and 10D, it is assumed that a terminal carried by a user is a smartphone and that guidance information is transmitted to the terminal of the user in the form of a push notification and is output through a vehicle-sharing application. However, this is merely illustrative, and the present disclosure is not limited thereto. For example, the guidance information may be posted on a web page managed by the vehicle-sharing service server, and may be transmitted in a form in which the address (URL, etc.) of the web page is sent via SMS or the like.

Figure 10A:
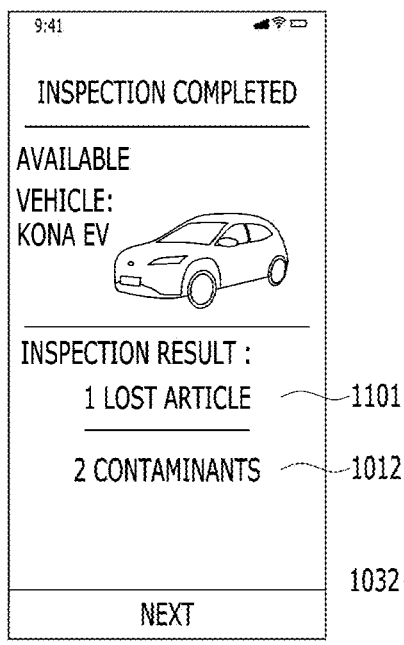
FIGS. 10A, 10B, 10C, and 10D show an example of the form in which guidance information is displayed on a terminal of a user according to an embodiment of the present disclosure.

Referring to FIG. 10A, when the guidance information is transmitted to the terminal of the user, a guidance screen indicating the inspection result may be displayed. The number of lost articles 1011 and the number of contaminants 1012 may be displayed on the inspection result guidance screen.

Figure 10B:
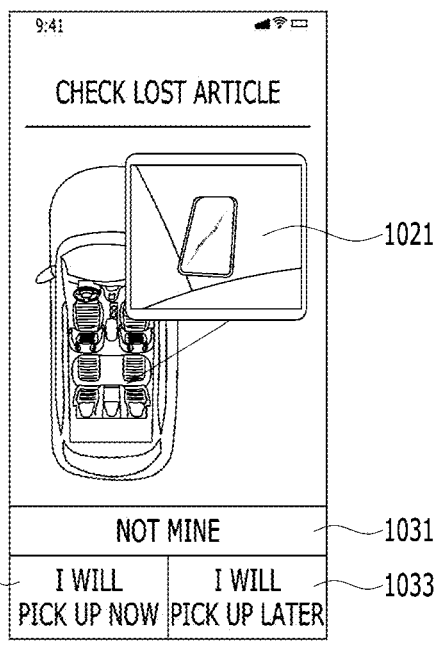

FIG. 10B shows a screen indicating guidance information on a lost article. The position of the lost article in the interior of the vehicle and an image 1021 of the lost article linked thereto may be displayed as the guidance information on the lost article. A response menu may be disposed at the lower end portion of the screen. The response menu may be composed of a "Not mine" button 1031, an "I will pick up now" button 1032, and an "I will pick up later" button 1033.

Figure 10C:
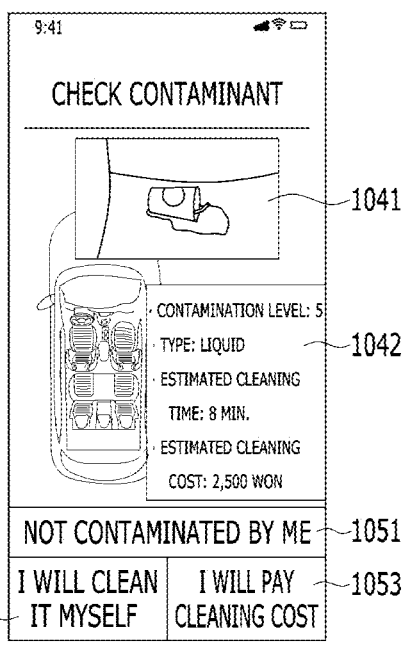

FIG. 10C shows a screen indicating guidance information on a contaminant. The position of the contaminant in the interior of the vehicle and an image 1041 of the contaminant linked thereto may be displayed as the guidance information on the contaminant. In addition, information 1042 on the contamination level, the type of contaminant, an estimated cleaning time, and an estimated cleaning cost (a penalty fee) may also be displayed. In addition, a response menu may be disposed at the lower end portion of the screen. The response menu may be composed of a "Not contaminated by me" button 1051, an "I will clean it myself" button 1052, and an "I will pay cleaning cost" button 1053.

Figure 10D:
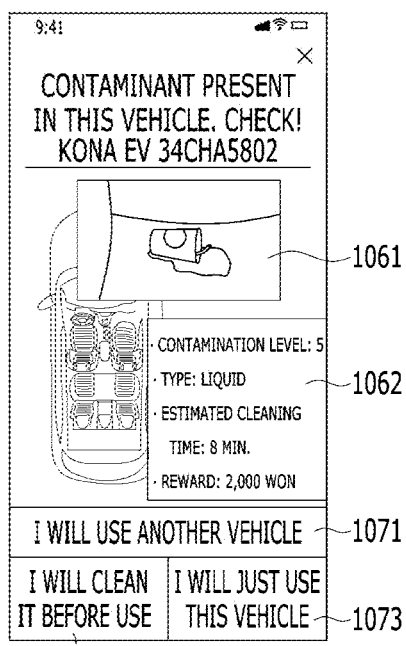

FIG. 10D shows a screen indicating guidance information on a contaminant to be transmitted to the next user. As described above, this guidance information may be transmitted to the next user when the previous user pays a contaminant cleaning cost or claims that the previous user did not contaminate the vehicle.

The position of the contaminant in the interior of the vehicle and an image 1061 of the contaminant linked thereto may be displayed as the guidance information on the contaminant. In addition, information 1062 on the contamination level, the type of contaminant, an estimated cleaning time, and a reward to be given to the next user when the next user cleans the contaminant may also be displayed. In addition, a response menu may be disposed at the lower end portion of the screen. The response menu may be composed of an "I will use another vehicle" button 1071 for selecting another vehicle rather than using the corresponding vehicle due to the contaminant, an "I will clean it before use" button 1072, and an "I will just use this vehicle" button 1073 for using the corresponding vehicle without cleaning the same.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a vehicle according to at least one embodiment of the present disclosure configured as described above is capable of determining the presence or absence of a contaminant or a lost article in the interior thereof after completion of use thereof in various manners and taking appropriate measures.

In addition, when indoor contamination or a lost article is detected, it is possible to provide information associated therewith to the previous user in a predetermined form so that the previous user takes measures and to report the indoor cleanliness state in advance to the next user.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of managing cleanliness of an interior of a vehicle, the method comprising:
   detecting an indoor state using a detector comprising at least a camera;
   generating at least one of first guidance information on a lost article or second guidance information on a contaminant upon detecting at least one of the lost article or the contaminant as a result of the detecting the indoor state; and
   transmitting the at least one guidance information to an outside,
   wherein the detecting the indoor state comprises:
     detecting at least one object in an indoor region subjected to state detection and recording a location where the at least one object is detected; and
     after detecting the at least one object and recording the location where the at least one object is detected, detecting whether contamination has occurred in the indoor region excluding the location where the at least one object is detected.

2. The method according to claim 1, wherein the first guidance information comprises at least one of an image of the lost article or a position of the lost article in the interior of the vehicle.

3. The method according to claim 1, wherein the second guidance information comprises at least one of a position of the contaminant in the interior of the vehicle, a contamination level, a type of the contaminant, an image of the contaminant, an estimated cleaning time, or an estimated cleaning cost.

4. The method according to claim 3, wherein a magnification at which the image of the contaminant is captured varies depending on at least one of a size of the contaminant, the contamination level, or the type of the contaminant.

5. The method according to claim 3, wherein a magnification at which the image of the contaminant is captured varies depending on a position of the contaminant relative to the camera.

6. The method according to claim 1, further comprising:
   receiving a response to the second guidance information when the at least one guidance information comprises the second guidance information; and
   when the received response corresponds to direct cleaning, granting access to the vehicle to a sender of the response.

7. The method according to claim 1, further comprising:
   waiting for a response to the second guidance information when the at least one guidance information comprises the second guidance information; and
   when a response to the second guidance information is not received for a predetermined period of time or when a response that does not correspond to direct cleaning is received, imposing a penalty on a sender of the response.

8. The method according to claim 7, further comprising when a response to the second guidance information is not received for a predetermined period of time or when a response that does not correspond to direct cleaning is received, transmitting third guidance information on the contaminant to a next user.

9. A non-transitory computer-readable recoding medium containing a program configured to perform a method of managing cleanliness of an interior of a vehicle, the method comprises:
   detecting an indoor state using a detector comprising at least a camera;
   generating at least one of first guidance information on a lost article or second guidance information on a contaminant upon detecting at least one of the lost article or the contaminant as a result of the detecting the indoor state; and
   transmitting the at least one guidance information to an outside,
   wherein the detecting the indoor state comprises:
     detecting at least one object in an indoor region subjected to state detection and recording a location where the at least one object is detected; and
     after detecting the at least one object and recording the location where the at least one object is detected, detecting whether contamination has occurred in the indoor region excluding the location where each of the at least one object is detected.

10. A device for managing cleanliness of an interior of a vehicle, the device comprising:
    a detector comprising at least a camera;
    a communicator; and
    a controller configured to:
    detect an indoor state based on information acquired using the detector;
    generate at least one of first guidance information on a lost article or second guidance information on a contaminant upon detecting at least one of the lost article or the contaminant as a result of detection of the indoor state; and
    perform control such that the at least one guidance information is transmitted to an outside through the communicator,
    wherein the controller first detects at least one object in an indoor region subjected to state detection and records a location where the at least one object is detected, and then detects whether contamination has occurred in the indoor region excluding the location where the at least one object is detected.

11. The device according to claim 10, wherein the first guidance information comprises at least one of an image of the lost article or a position of the lost article in the interior of the vehicle.

12. The device according to claim 10, wherein the second guidance information comprises at least one of a position of the contaminant in the interior of the vehicle, a contamination level, a type of the contaminant, an image of the contaminant, an estimated cleaning time, or an estimated cleaning cost.

13. The device according to claim 12, wherein a magnification at which the image of the contaminant is captured varies depending on at least one of a size of the contaminant, the contamination level, or the type of the contaminant.

14. The device according to claim 12, wherein a magnification at which the image of the contaminant is captured varies depending on a position of the contaminant relative to the camera.

15. The device according to claim 12, wherein, when a previous user does not clean the contaminant, the estimated cleaning cost corresponds to a penalty fee to be imposed on the previous user, and
wherein, when a next user directly cleans the contaminant, the estimated cleaning cost corresponds to an amount of a reward to be given to the next user.

16. The device according to claim 10, wherein, when the at least one guidance information comprises the second guidance information and when a response to the second guidance information is received through the communicator and corresponds to direct cleaning, the controller performs control such that access to the vehicle is granted to a sender of the response.

17. The device according to claim 10, wherein, when the at least one guidance information comprises the second guidance information, the controller waits for a response to the second guidance information, and
wherein, when a response to the second guidance information is not received for a predetermined period of time or when a response that does not correspond to direct cleaning is received, the controller performs control such that a penalty is imposed on a sender of the response.

18. The device according to claim 17, wherein, when a response to the second guidance information is not received for a predetermined period of time or when a response that does not correspond to direct cleaning is received, the controller performs control such that third guidance information on the contaminant is transmitted to a next user through the communicator.

\* \* \* \* \*